No. 680,980. Patented Aug. 20, 1901.
H. G. JOHNSON.
BICYCLE.
(Application filed Dec. 16, 1896.)
(No Model.)
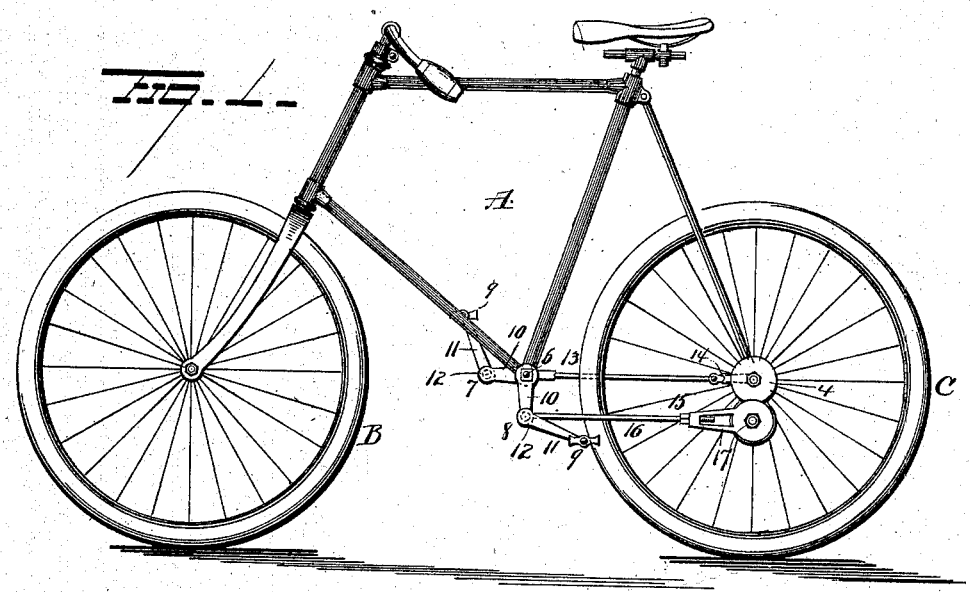

UNITED STATES PATENT OFFICE.

HANS G. JOHNSON, OF WAUKON, IOWA.

BICYCLE.

SPECIFICATION forming part of Letters Patent No. 680,980, dated August 20, 1901.

Application filed December 16, 1896. Serial No. 615,891. (No model.)

*To all whom it may concern:*

Be it known that I, HANS G. JOHNSON, a resident of Waukon, in the county of Allamakee and State of Iowa, have invented certain new and useful Improvements in Bicycles; and I do hereby declare the following to be a full, clear, and exact description of the invention, such as will enable others skilled in the art to which it appertains to make and use the same.

My invention relates to an improvement in bicycles, the object of the invention being to provide a simple and efficient driving mechanism by means of which great speed of the machine can be attained with a minimum amount of frictional resistance, the construction also being such as to avoid dead-centers.

A further object is to construct a bicycle in such manner that it shall be simple and which shall be effectual in all respects in the performance of its functions.

With these objects in view the invention consists in certain novel features of construction and combinations and arrangements of parts, as hereinafter set forth, and pointed out in the claim.

In the accompanying drawings, Figure 1 is a view of a bicycle embodying my invention. Figs. 2 and 3 are detail views.

A represents a bicycle-frame, B the front wheel, and C the rear wheel. The hub 1 of the rear wheel C of the bicycle is secured to a sleeve 2, and the latter is mounted on a revoluble shaft or axle 3. A hollow crank-arm or casing 4 is secured to one end of the shaft or axle 3, and within said hollow crank-arm or casing a pinion 5 is disposed and secured to the sleeve 2 or to the hub of the rear wheel, so as to rotate the latter.

Pedal-cranks 7 8 are revolubly connected to the crank-hanger 6 and provided at their free ends with pedals 9. Each pedal-crank comprises two arms 10 11, disposed at an angle to each other, whereby to obviate the possibility of dead-centers. The two arms of each pedal-crank are connected together by a short section 12, which constitutes a wrist-pin for the attachment of pitmen. The pedal-crank 7 has connected thereto a pitman 13, the other end of which is attached to a crank-arm 14, secured to one end of the shaft or axle 3 of the rear wheel. A pitman 15 is connected with the pedal-crank 8 and comprises two sections 16 17. The section 16, which is connected to the pedal-crank, is made in the form of a rod, having a screw-threaded portion 18 to enter a threaded hole in the smaller end of the tapering section 17 of the pitman 15, accidental displacement of the two sections being prevented by means of a nut 19. The larger end of section 17 of pitman 15 is made in the form of a disk 20, which is provided centrally with a hub $20^a$, through which a pin 21, secured to the hollow crank-arm or casing 4, loosely passes, the free end of said pin being provided with a nut 22. Another disk 23 is secured to the hub $20^a$, and between said disks an annular series of steel pins 24 are secured, the pins passing through perforations in both disks. A construction similar to a lantern-wheel is thus formed and is made to mesh with the pinion 5 on the sleeve 2.

It will be seen that the connections between the pitman 15 and the rear wheel will be protected from dirt by the hollow crank-arm or casing 4. Should any dust find its way into the hollow axle, it will escape between the pins of the lantern-wheel, and thus clogging, which would result by the use of a pinion instead of the lantern-wheel, will be obviated. Another great advantage in the construction of the connection between the pitman 15 and pinion 5 arises from the ability to repair the same should one of the pins 24 become broken, injured, or lost.

It is apparent that should the lantern-wheel become disabled a broken or bent pin could be readily replaced by a new one, whereas if a pinion were used an entirely new pinion and pitman would be necessary in case of accident to the pinion in use.

From this construction and arrangement of parts it will be seen that when the pedal-cranks are rotated by the rider accelerated motion will be imparted to the sleeve 2 alternately and strain will be equally divided on both sides of the machine. It is apparent that by means of my improved gearing the speed of the machine can be greatly increased and the amount of speed desired can be regulated by the sizes of the pinion and lantern-wheel relatively to each other.

My improvements are very simple in construction, result in the acceleration of the speed of the machine without unduly increasing frictional resistance, and are effectual in all respects in the performance of their functions.

Slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

A riding-wheel comprising a driving-shaft having cranks, a driven shaft having a crank, a pitman connecting a crank of the driving-shaft with the crank on the driven shaft, a casing mounted eccentrically on the driven shaft, a hub mounted loosely on the driven shaft, a pinion secured to the hub within the casing, a lantern-frame journaled to the casing and meshing with the pinion around which it rotates in the casing having a pitman connected with the other crank of the driving-shaft, as set forth.

In testimony whereof I have signed this specification in the presence of two subscribing witnesses.

HANS G. JOHNSON.

Witnesses:
GEO. P. LUFELDT,
E. M. HANCOCK.